(12) United States Patent
Wang et al.

(10) Patent No.: US 9,773,581 B2
(45) Date of Patent: Sep. 26, 2017

(54) CATHODE MATERIAL FOR A LI—S BATTERY AND THE METHOD FOR PREPARING THE SAME, A CATHODE MADE OF THE CATHODE MATERIAL AND A LI—S BATTERY COMPRISING THE CATHODE

(71) Applicants: Robert Bosch GmbH, Stuttgart (DE); Shanghai Jiaotong University, Shanghai (CN)

(72) Inventors: Jiulin Wang, Shanghai (CN); Lichao Yin, Shanghai (CN); Jun Yang, Shanghai (CN); NaHong Zhao, Shanghai (CN); Longjie Zhou, Shanghai (CN)

(73) Assignees: Robert Bosch GmbH, Stuttgart (DE); Shanghai Jiaotong University, Minhang District, Shanghai (CN)

( * ) Notice: Subject to any disclaimer, the term of this patent is extended or adjusted under 35 U.S.C. 154(b) by 0 days.

(21) Appl. No.: 14/646,937

(22) PCT Filed: Nov. 30, 2012

(86) PCT No.: PCT/CN2012/085657
§ 371 (c)(1),
(2) Date: May 22, 2015

(87) PCT Pub. No.: WO2014/082296
PCT Pub. Date: Jun. 5, 2014

(65) Prior Publication Data
US 2015/0303457 A1 Oct. 22, 2015

(51) Int. Cl.
*H01B 1/06* (2006.01)
*H01M 4/58* (2010.01)
(Continued)

(52) U.S. Cl.
CPC ................. *H01B 1/06* (2013.01); *H01B 1/04* (2013.01); *H01M 4/133* (2013.01); *H01M 4/136* (2013.01);
(Continued)

(58) Field of Classification Search
CPC .. H01B 1/04; H01B 1/06; H01B 1/10; H01M 4/133; H01M 4/136; H01M 4/137;
(Continued)

(56) References Cited

U.S. PATENT DOCUMENTS

2011/0104571 A1* 5/2011 Zhamu ................. H01B 1/122
429/231.95
2011/0165466 A1* 7/2011 Zhamu ................. B82Y 30/00
429/231.95

(Continued)

FOREIGN PATENT DOCUMENTS

CN 1343017 A 4/2002
CN 101891930 A 11/2010
(Continued)

OTHER PUBLICATIONS

Yin et al., "Polyacrylonitrile/graphene composite as a precursor to a sulfur-based cathode material for high-rate rechargeable Li—S batteries", Energy Environ. Sci., 5, pp. 6966-6972, (2012).*
(Continued)

*Primary Examiner* — Harold Pyon
*Assistant Examiner* — Matthew R Diaz
(74) *Attorney, Agent, or Firm* — Maginot, Moore & Beck LLP

(57) ABSTRACT

The present invention provides a cathode material for a Li—S battery. The cathod material comprises dehydrogenized acrylonitrile based polymer, sulfur and GNS (Graphene NanoSheet), wherein the cathode material particles are spherical, the content of dehydrogenized acrylonitrile
(Continued)

based polymer is 20-79 wt %, the content of sulfur is 20-79 wt % and the content of GNS is 1-30 wt %. Also provided a method for preparing a cathode material, a cathode made of the cathod material and a Li—S battery comprising the cathode.

7 Claims, 3 Drawing Sheets

(51) Int. Cl.
*H01M 4/1393* (2010.01)
*H01M 4/583* (2010.01)
*H01M 4/137* (2010.01)
*H01M 4/133* (2010.01)
*H01M 4/36* (2006.01)
*H01M 4/62* (2006.01)
*H01M 4/136* (2010.01)
*H01M 4/38* (2006.01)
*H01B 1/04* (2006.01)
*H01M 4/587* (2010.01)
*H01M 10/052* (2010.01)
*H01M 4/02* (2006.01)

(52) U.S. Cl.
CPC ......... *H01M 4/137* (2013.01); *H01M 4/1393* (2013.01); *H01M 4/362* (2013.01); *H01M 4/364* (2013.01); *H01M 4/38* (2013.01); *H01M 4/58* (2013.01); *H01M 4/583* (2013.01); *H01M 4/587* (2013.01); *H01M 4/5815* (2013.01); *H01M 4/62* (2013.01); *H01M 4/622* (2013.01); *H01M 4/625* (2013.01); *H01M 10/052* (2013.01); *H01M 2004/028* (2013.01)

(58) Field of Classification Search
CPC ............. H01M 4/1393; H01M 4/1397; H01M 4/1399; H01M 4/362; H01M 4/364; H01M 4/366; H01M 4/38; H01M 4/58; H01M 4/5815; H01M 4/583; H01M 4/587; H01M 4/602; H01M 4/604; H01M 4/62; H01M 4/622; H01M 4/625
See application file for complete search history.

(56) References Cited

U.S. PATENT DOCUMENTS

| 2012/0064409 A1* | 3/2012 | Zhamu | B82Y 30/00 429/221 |
| 2013/0164635 A1* | 6/2013 | Schmidt | H01M 4/136 429/337 |
| 2014/0017394 A1* | 1/2014 | Wegner | H01M 4/0404 427/58 |

FOREIGN PATENT DOCUMENTS

| CN | 105591076 A * | 5/2016 | |
| DE | WO 2012095206 A1 * | 7/2012 | .......... H01M 4/0404 |
| EP | 2 337 126 A1 | 6/2011 | |
| WO | 2012/040934 A1 | 4/2012 | |
| WO | 2012/149672 A1 | 11/2012 | |

OTHER PUBLICATIONS

English machine translation of CN 105591076 A (2016).*
Guo et al., "Graphene nanosheet: synthesis, molecular engineering, thin film, hybrids, and energy and analytical applications," Chem. Soc. Rev., 40, 2644-2672 (2011).*
Scientific Background on the Nobel Prize in Physics 2010, Graphene, The Royal Swedish Academy of Sciences (2010).*
Nanosheet—Wikipedia (retrieved Mar. 10, 2017 from https://en.wikipedia.org/wiki/Nanosheet).*
International Search Report corresponding to PCT Application No. PCT/CN2012/085657, mailed Sep. 12, 2013 (6 pages).
Leilei Wang et al., "Improved Polyvinylpyrrolidone (PVP) graphite nanocomposites by Solution Compounding and Spray Dying", Polymers for Advanced Technologies, vol. 23, No. 3, Mar. 25, 2011, pp. 652-659, XP055256870.

* cited by examiner

BACKGROUND## CATHODE MATERIAL FOR A LI—S BATTERY AND THE METHOD FOR PREPARING THE SAME, A CATHODE MADE OF THE CATHODE MATERIAL AND A LI—S BATTERY COMPRISING THE CATHODE

This application is a 35 U.S.C. §371 National Stage Application of PCT/CN2012/085657, filed on Nov. 30, 2012, the disclosure of which is incorporated herein by reference in its entirety.

FIELD OF THE INVENTION

The present invention relates to a cathode material for rechargeable lithium-sulfur (Li—S) battery and the method for forming the same.

BACKGROUND

The lithium ion battery is a rechargeable cell with a very high energy density. The theoretical specific energy density of lithium-sulfur batteries is 2600 Wh/kg, which is one of the highest energy densities for batteries. Li—S batteries may become a successor of lithium-ion cells because of their higher energy density and the lower cost.

Elemental sulfur is a promising cathode material with high theoretical specific capacity and specific energy density for rechargeable lithium battery. However, sulfur cannot be solely used as the cathode material in Li—S batteries due to its high electrical resistivity and the high solubility of polysulfides in organic electrolyte solutions, resulting in a low utilization of the active material, a low coulombic efficiency, and a short cycle life of the sulfur electrode.

An international patent application No. PCT/CN2011/073598 discloses a cathode material for Li—S battery and method for forming the same. The cathode material comprises an acrylonitrile based polymer, sulfur and graphene. The international patent application also presents a method for preparing a cathode material for Li—S battery, including: dispersing 10-30 parts by weight of acrylonitrile based polymer in 30-1000 parts by weight of water, adding 0.1-5 parts by weight of graphene, adding 20-200 parts by weight of sulfur to said mixture, and the thus obtained mixture of acrylonitrile based polymer/sulfur/graphene oxide is homogenized before being heated to a temperature of 200-400° C. under an inert atmosphere and kept at said temperature for 1-20 hours, so as to obtain a cathode material.

Another international patent application No. PCT/CN2010/077530 discloses a cathode material for Li—S battery. The cathode material for Li—S battery comprises a dehydrogenized acrylonitrile copolymer, sulfur and carbon nanotubes, wherein the weight percentages of these components are as below: 20%≤dehydrogenized acrylonitrile copolymer ≤70%, 20%≤sulfur≤80%, 0%≤carbon nanotubes≤20%. The international patent application also presents a method for preparing a cathode material for Li—S battery, including: mixing carbon nanotubes and acrylonitrile copolymer in a ball mill, wherein ethanol is used as a dispersant; adding sulfur into the ball mill and further mixing; drying the mixture under vacuum to remove ethanol; heat treating and dwelling the mixture under an inert atmosphere; and cooling at ambient temperature, so as to obtain a cathode material.

However, as shown in FIG. 1 of the international patent application No. PCT/CN2010/077530, it can be seen that the cathode material partial is irregular particle. In order to get high coverage electrode film, there is a need for the material having a better particle morphology and an easy formation of the electrode film with a higher density to further improve the industrialization of the Li—S battery.

SUMMARY OF THE INVENTION

In light of the above, one of the objects of the present invention is to provide an efficient cathode material for a Li—S battery and the method for preparing the same.

Another object of the present invention is to provide an efficient cathode for a Li—S battery.

Still another object of the present invention is to provide an efficient Li—S battery with good charge and discharge performances.

In one aspect, the present invention provides a cathode material for a Li—S battery comprising dehydrogenized acrylonitrile based polymer, sulfur and GNS (Graphene NanoSheet), wherein the cathode material particle is spherical, the content of dehydrogenized acrylonitrile based polymer is 20-79 wt %, preferably 50-55 wt. %, the content of sulfur is 20-79 wt %, preferably 45-50 wt. %, and the content of GNS is 1-30 wt %, preferably 3-10 wt. %.

Preferably, the particle size distribution of the cathode material has single peak character in the range of 1-30 μm.

In the present invention, the acrylonitrile based polymer plays the role of polymer matrix that envelops sulfur. Preferably, the acrylonitrile based polymer comprises acrylonitrile copolymer and acrylonitrile homopolymer with a molecular weight range of 50,000-300,000.

Acrylonitrile copolymers refer to copolymers that contain acrylonitrile units. Acrylonitrile homopolymer refer to polyacrylonitrile. Preferably, the acrylonitrile copolymer is selected from the group comprising acrylonitrile-butadiene copolymer, acrylonitrile-vinyl chloride copolymer, acrylonitrile-methyl acrylate copolymer, acrylonitrile-methyl methacrylate copolymer, or acrylonitrile-styrene copolymer, and molar percentage of acrylonitrile unit in the acrylonitrile copolymer is 90%-99%.

In another aspect, the present invention provides a cathode made of the above cathode material.

In still another aspect, the present invention provides Li—S battery comprising the above cathode. Specifically, the Li—S battery may comprise a lithium anode, a cathode made of the cathode material according to the present invention and electrolyte.

In yet another aspect, the present invention provides a method for preparing a cathode material for a Li—S battery, comprising steps of:

dispersing 0.05-0.2 parts by weight of graphene nanosheet in water;

homogenizing the dispersion, preferably, by sonicating the dispersion;

adding 1-2 parts by weight of acrylonitrile based polymer with a particle size range of 10 nm-500 nm, preferably, the acrylonitrile based polymer having a particle size range of 40 nm-200 nm;

homogenizing the suspension preferably by sonicating the suspension; and drying the homogenized suspension by a spray drying process to obtain spherical secondary particles with a particle size range of 1-20 μm;

mixing 5-20 parts by weight of sulfur with obtained spherical secondary particles by pestle-milling;

heating the mixture in a protective atmosphere; and cooling at ambient temperature to obtain the cathode material with cathode material particles spherical-shaped.

The protective atmosphere could be an inert atmosphere or nitrogen atmosphere.

Preferably, heating the mixture is conducted at a temperature of 200-400° C. Heating the mixture is conducted for 1-20 h.

Preferably, the particle size distribution of the cathode material has single peak character in the range of 1-30 μm.

Preferably, the acrylonitrile based polymer comprises acrylonitrile copolymer and acrylonitrile homopolymer with a molecular weight range of 50,000-300,000.

Preferably, the acrylonitrile copolymer is selected from the group comprising acrylonitrile-butadiene copolymer, acrylonitrile-vinyl chloride copolymer, acrylonitrile-methyl acrylate copolymer, acrylonitrile-methyl methacrylate copolymer, or acrylonitrile-styrene copolymer, and molar percentage of acrylonitrile unit in the acrylonitrile copolymer is 90%-99%.

The spherical ternary composite, with the structures of dehydrogenized acrylonitrile based polymer embedded sulfur and homogeneously distributed GNS in the above binary material, dramatically enhances the sulfur utilization, cycle life, and power properties.

Acrylonitrile based polymers react with elemental sulfur at 200-400° C. to form a polymer matrix, in which sulfur can be embedded in the scale of nano meter or even at the molecular level. This special structure ensures high electrochemical activity of sulfur materials; and the sulfur utilization in practical batteries was more than 90%.

Another improvement by this special structure is that the dissolution of poly-sulfides, discharge product, was effectively restrained via strong interaction between polymer matrix and sulfur, as well as poly-sulfides. Adding graphene nanosheets, a good electrical conductor, into the polymer/sulfur composite can dramatically increase the conductivity of the cathode materials.

Due to the spherical shape of the cathode material, it can be better attached to the electrode film and more difficult to fall from the electrode film over the prior art. Consequently, compacted density, specifically cathode density is higher than that in the prior art and thus the efficiency of the Li—S battery containing the cathode made of the cathode material of the present invention is improved.

The spherical ternary composite, with the structures of polymer embedded sulfur and homogeneously distributed GNS in the above binary material, dramatically enhances the sulfur utilization, cycle life, and power properties.

BRIEF DESCRIPTION OF THE DRAWINGS

The foregoing and other objects, features, and advantages of the invention will be apparent from the following more particular description of preferred embodiments as illustrated in the accompanying drawings, in which.

DETAILED DESCRIPTION OF THE INVENTION

Figure 1:
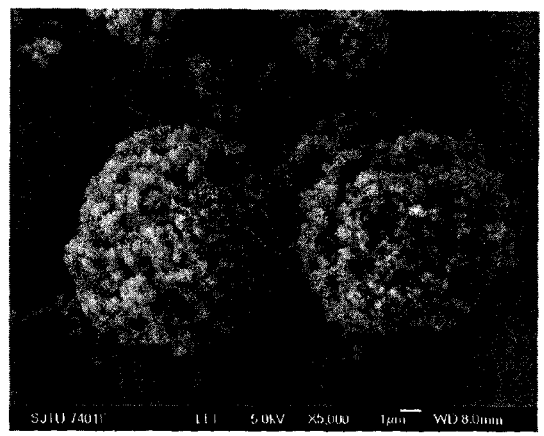
FIG. 1 shows the SEM picture of the cathode material obtained from Example 1.

While the invention covers various modifications and alternative constructions, embodiments of the invention are shown in the drawings and will hereinafter be described in detail. However it should be understood that the specific description and drawings are not intended to limit the invention to the specific forms disclosed. On the contrary, it is intended that the scope of the claimed invention includes all modifications and alternative constructions thereof falling within the scope of the invention as expressed in the appended claims.

All publications, patent applications, patents and other references mentioned herein, if not otherwise indicated, are explicitly incorporated by reference herein in their entirety for all purposes as if fully set forth.

A Li—S battery according to the present invention may comprises a lithium anode, a cathode made of the cathode material of Example 1/2, and electrolyte.

The comparative battery may comprises a lithium anode, a cathode made of the cathode material of the comparative example, and electrolyte.

Graphene nanosheets may be prepared by the steps of adding graphite oxide into water and heating the solution or by the steps of adding graphite oxide into water and adding a reducing agent into the solution. The reducing agent may be for example selected from hydrazine hydrate, sodium borohydride, potassium borohydride, glucose and aqueous ammonia, sodium polysulfide.

EXAMPLE 1

The Preparation of the Cathode Material According to the Present Invention 0.1 g GNS is added into adequate water used as dispersant. The dispersion is sonicated. 1 g polyacrylonitrile with a particle size range of 10 nm-500 nm was added to the aqueous suspension of GNS. The mixed suspension is further sonicated and then dried by a spray drying process to remove water. Consequently, spherical secondary particles containing GNS and polyacrylonitrile and having a particle size range of 1-20 μm are obtained.

Figure 2:
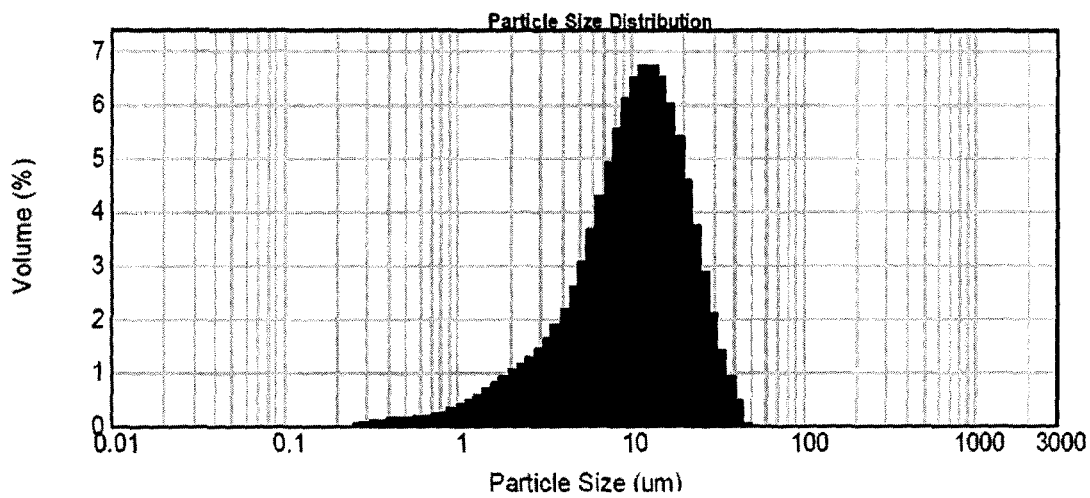
FIG. 2 shows the particle size distribution of the cathode material obtained from Example 1.

8 g sulfur is mixed with the obtained secondary particles by pestle-milling. The collected mixture is heated at 300° C. in an argon atmosphere for 5 h to get the target spherical cathode material particles with a particle size of 1-20 μm, as shown in FIG. 1. As shown in FIG. 2, the particle size distribution shows a single peak character in the range of 1-30 μm. Main particles sizes distribute in the range of 5-15 μm.

The spherical ternary composite has 48 wt % dehydrogenized polyacrylonitrile, 47 wt % sulfur and 5 wt % GNS.

COMPARATIVE EXAMPLE 0.1 g GNS is added into adequate water used as dispersant. The dispersion is sonicated. 1 g polyacrylonitrile with a particle size range of 10 nm-500 nm was added to the aqueous suspension of GNS. The mixed suspension is further sonicated and then dried by a heating process during which the suspension is dried at 80° C. to remove water.

Figure 4:
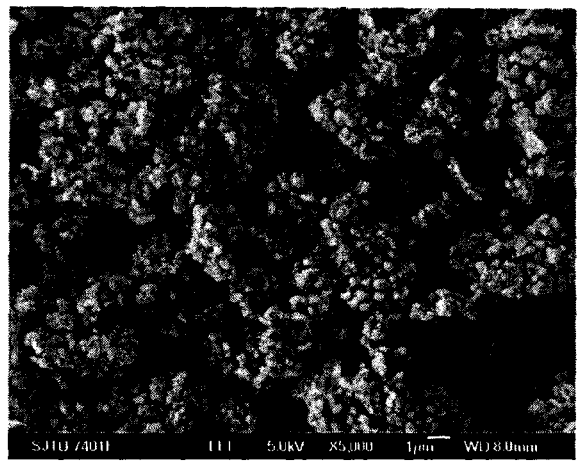
FIGS. 4 shows the SEM picture of the cathode material obtained from the comparative example respectively.

8 g sulfur is mixed with the obtained binary composite by pestle-milling. The collected mixture is heated at 300° C. in an argon atmosphere for 5 h to get comparative cathode material particles. As shown in FIG. 4, the composite particles are irregular.

Figure 5:
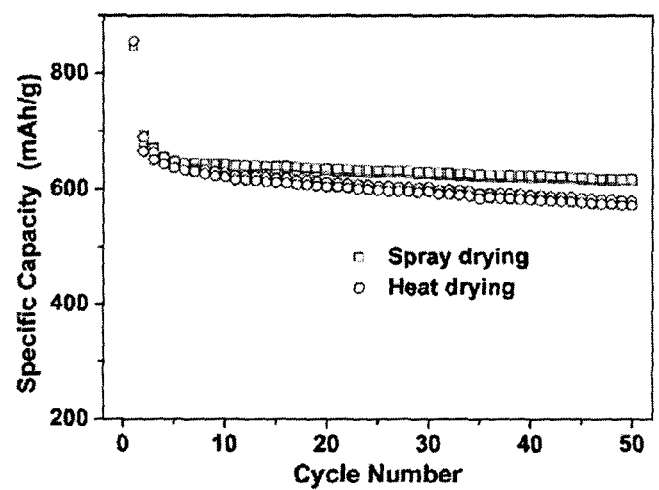
FIG. 5 shows the cycling stability of the Li—S batteries comprising the cathode made of the cathode material obtained from Example 1 and comparative example respectively.
Figure 6:
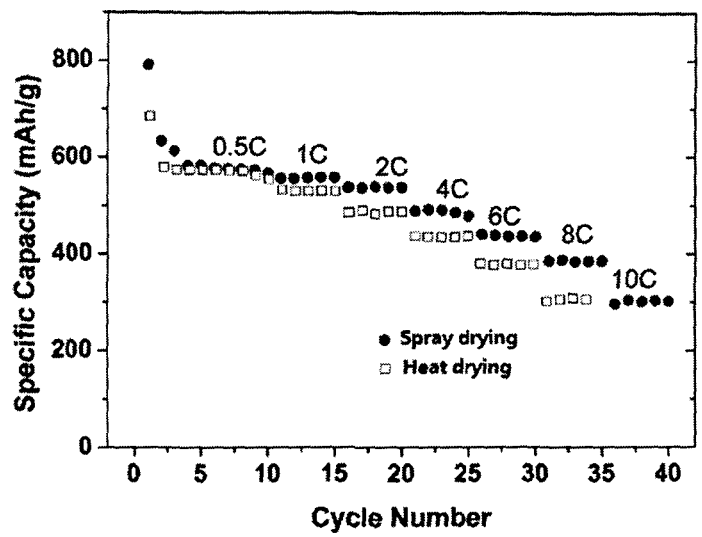
FIG. 6 shows the rate performance of the Li—S batteries comprising the cathode made of the cathode material obtained from Example 1 and comparative example respectively, wherein C indicates discharge power rate. For example, 1C represents a 1-hour discharge and 10C represents a 0.1-hour discharge.
Figure 7:
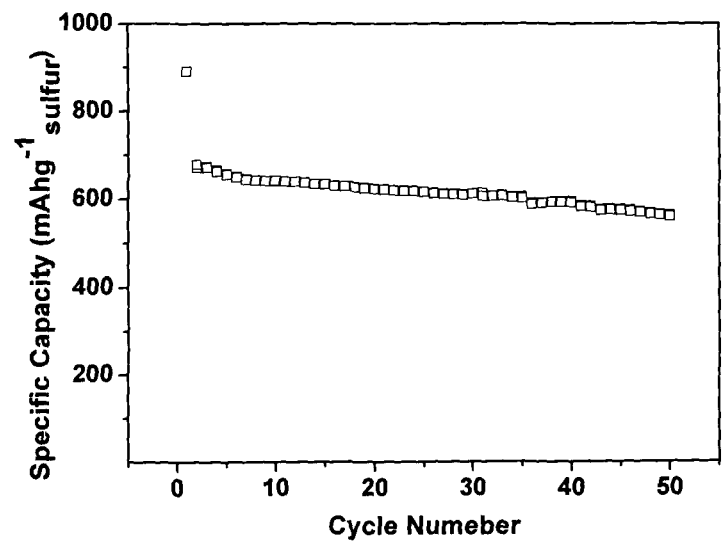
FIG. 7 shows the cycling stability of the Li—S batteries comprising the cathode made of the cathode material obtained from Example 2

FIG. 5 shows the cycling stability of the Li—S batteries comprising the cathode made of the cathode material obtained from Example 1 and comparative example respectively. FIG. 6 shows the rate performance of the Li—S battery comprising the cathode made of the cathode material obtained from Example 1 and comparative example respectively.

As shown in FIG. 5, the Li—S battery comprising the cathode made of the cathode material obtained from Example 1 demonstrates a first discharge capacity of 863 mAh/g and a reversible capacity of 680 mAh/g, utilization of active material higher than 86%, cycle life estimated up to 500 (80% retention). The Li—S battery comprising the cathode made of cathode material of the comparative example has similar first discharge and charge capacities and similar utilization of active material, but only has the cycle life estimated up to 300 (80% retention).

When the cathode material obtained from Example 1 discharges at 10C, a capacity up to 331.5 mAh/g for Example 1 can be delivered, as shown in FIG. 6, The Li—S battery comprising the cathode made of cathode material of the comparative example can only deliver a similar capacity at a smaller rate of 8C.

As shown in FIG. 5 and FIG. 6, results of these measurements show that the cycle stability of the Li—S battery according to the present invention is longer than the Li—S battery comprising the cathode made of the cathode material prepared according to comparative example and the power rate performance of the Li—S battery according to the present invention is superior to the Li—S battery comprising the cathode made of the cathode material prepared according to comparative example.

EXAMPLE 2

The Preparation of the Cathode Material According to the Present Invention 0.1 g GNS is added into adequate water used as dispersant. The dispersion is sonicated. 1 g acrylonitrile-styrene copolymer with a particle size range of 10 nm-500 nm was added to the aqueous suspension of GNS. The mixed suspension is further sonicated and then dried by a spray drying process to remove water. Consequently, spherical secondary particles containing GNS and acrylonitrile-styrene copolymer and having a particle size range of 1-20 μm are obtained.

Figure 3:
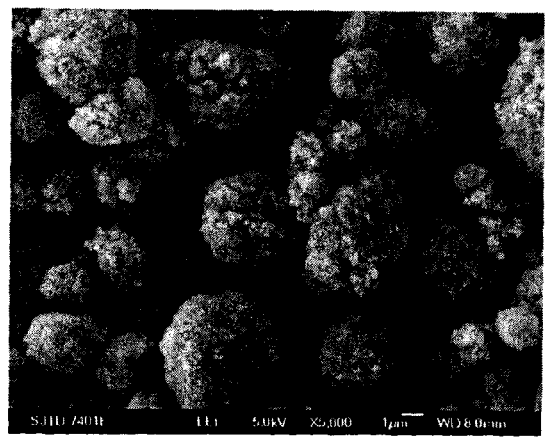
FIGS. 3 shows the SEM picture of the cathode material obtained from Example 2.

8 g sulfur is mixed with the obtained secondary particles by pestle-milling. The collected mixture is heated at 300° C. in an argon atmosphere for 5 h to get the target spherical cathode material particles with a particle size of 1-20 μm, as shown in FIG. 3.

The spherical ternary composite has 50 wt % dehydrogenized acrylonitrile-styrene copolymer, 47 wt % sulfur and 3 wt % GNS.

FIG. 6 shows the cycling stability of the Li—S batteries comprising the cathode made of the cathode material obtained from Example 2. As shown in FIG. 6, the Li—S battery comprising the cathode made of the cathode material obtained from Example 2 demonstrates a first discharge capacity of 895 mAh/g and a reversible capacity of 655 mAh/g, utilization of active material higher than 83%, cycle life estimated up to 200 (80% retention).

It should be noted that the aforesaid embodiments are illustrative of this invention instead of restricting it, substitute embodiments may be designed by those skilled in the art without departing from the scope of the claims below. The wordings such as "contain", "containing", "comprise" and "comprising" do not exclude elements or steps which are present but not listed in the description and the claims.

What is claimed is:

1. A method for preparing a cathode material for a Li—S battery, the method comprising:
   dispersing a first amount of graphene nanosheet in water to form a dispersion;
   homogenizing the dispersion;
   adding a second amount of acrylonitrile based polymer with a particle size range of 10 nm-500 nm to the dispersion to form a suspension;
   homogenizing the suspension and drying the homogenized suspension by a spray drying process to obtain spherical secondary particles with a particle size range of 1-20 μm;
   mixing a third amount of sulfur with the obtained spherical secondary particles by pestle-milling to form a mixture;
   heating the mixture; and
   cooling the heated mixture to obtain the cathode material, the cathode material having spherically-shaped cathode material particles, wherein the first amount, the second amount, and the third amount are selected such that the cathode material is formed from 0.05 to 0.2 parts by weight graphene nanosheet, 1-2 parts by weight acrylonitrile based polymer, and 5-20 parts by weight sulfur.

2. The method according to claim 1, wherein heating the mixture includes heating the mixture at a temperature of 200-400° C.

3. The method according to claim 2, wherein heating the mixture includes heating the mixture for one to twenty hours.

4. The method according to claim 1, wherein the spherically shaped cathode material particles comprise a particle size distribution having a peak in the range of 1-30 μm.

5. The method according to claim 1, wherein:
   the acrylonitrile based polymer is an acrylonitrile copolymer selected from acrylonitrile-butadiene copolymer, acrylonitrile-vinyl chloride copolymer, acrylonitrile-methyl acrylate copolymer, acrylonitrile-methyl methacrylate copolymer, and acrylonitrile-styrene copolymer, and
   a molar percentage of acrylonitrile unit in the acrylonitrile copolymer is 90%-99%.

6. The method of claim 1, wherein the obtained spherical secondary particles contain graphene nanosheet and acrylonitrile-styrene copolymer.

7. The method of claim 1, wherein the obtained spherical secondary particles contain graphene nanosheet and polyacrylonitrile.

* * * * *